July 4, 1967 F. E. KINGSTON 3,329,890
GYROMAGNETIC RESONANCE APPARATUS
Filed Aug. 17, 1964 2 Sheets-Sheet 2
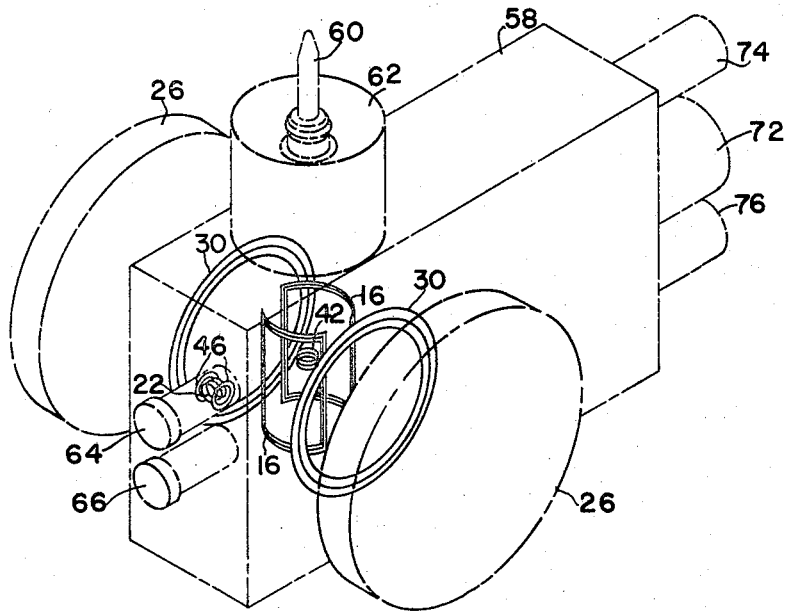
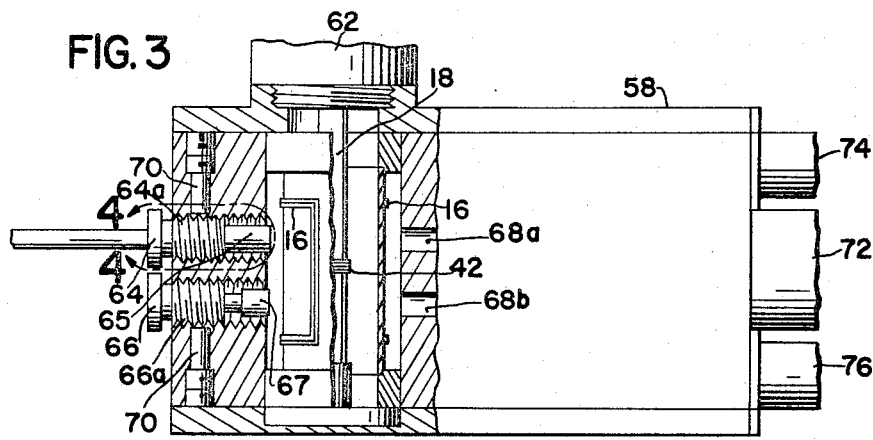
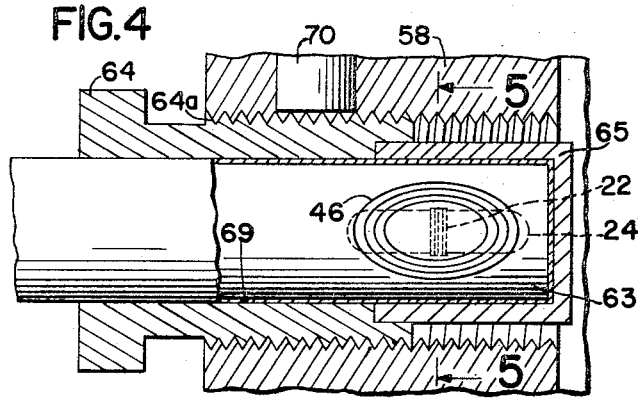
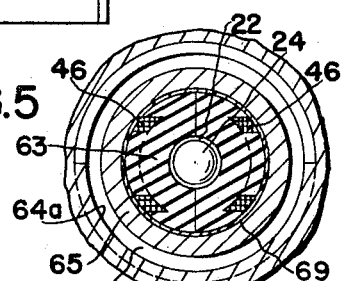
INVENTOR.
FLOYD E. KINGSTON
BY
ATTORNEY

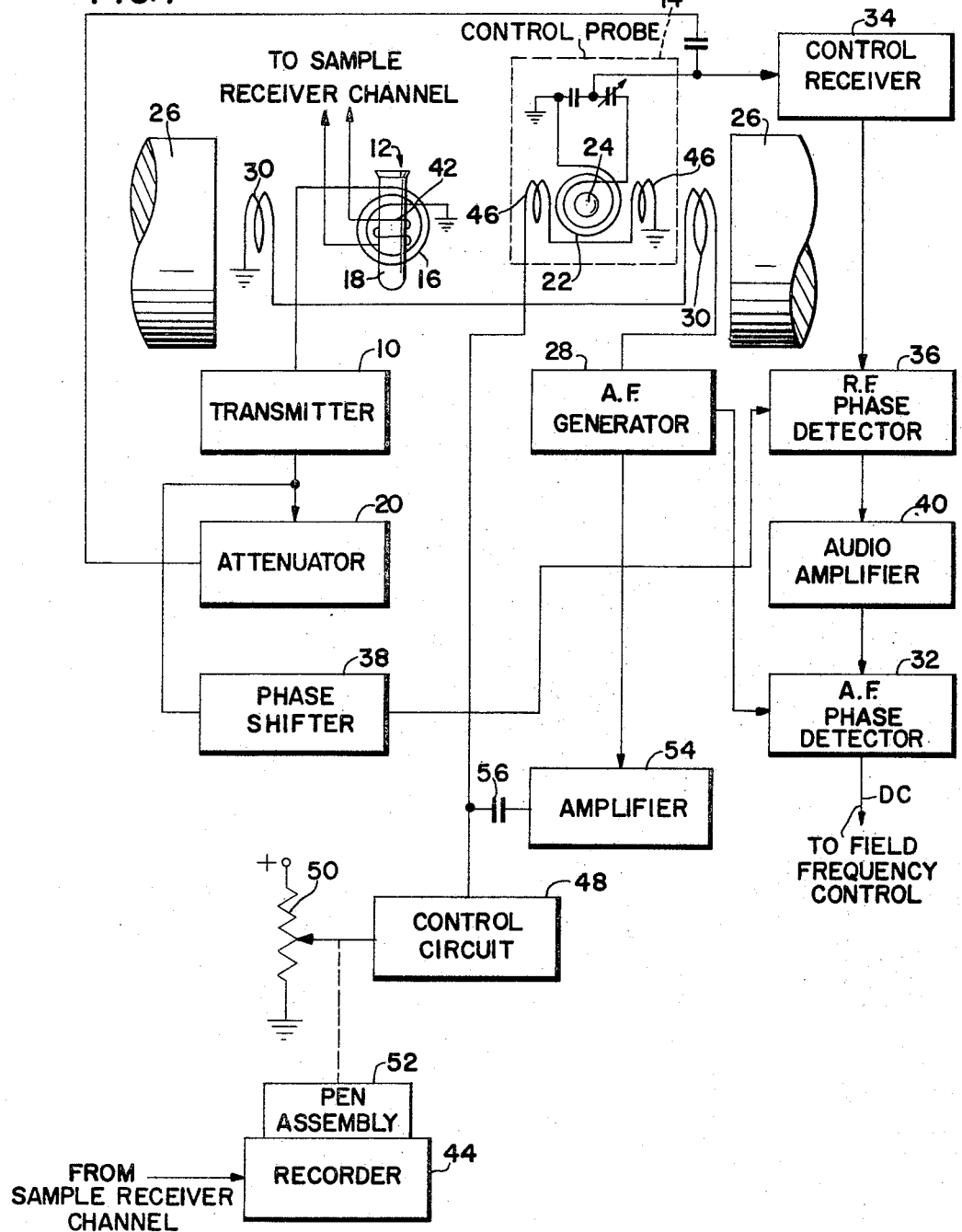

United States Patent Office 3,329,890
Patented July 4, 1967

3,329,890
GYROMAGNETIC RESONANCE APPARATUS
Floyd E. Kingston, Palo Alto, Calif., assignor to Varian Associates, Palo Alto, Calif., a corporation of California
Filed Aug. 17, 1964, Ser. No. 389,893
6 Claims. (Cl. 324—.5)

This invention relates to gyromagnetic resonance apparatus and in particular to a novel and improved high resolution spectrometer.

Gyromagnetic resonance spectrometers may be classified generally as: (1) single channel types which include a measurement channel wherein an unknown sample to be analyzed is measured, detected and recorded as spectral peaks or resonance lines, and (2) double channel types which further include a reference channel incorporating a control sample utilized for field-frequency stabilization. The double channel type may be further classified into (a) internal reference systems wherein the reference or control sample is mixed with the unknown sample in the same tube, or (b) external reference systems wherein a separate tube is utilized for the control sample and the signal from each sample is processed in a separate channel.

One type of external reference system is shown in U.S. Patent 3,173,083 and a probe assembly that may be utilized in such a system is disclosed in U.S. Patent 3,172,035. In this probe assembly, two sample tubes are disposed closely side by side with their longitudinal axes substantially parallel and the coils and accessories associated with the tubes assume a novel configuration. Other probe assembly configurations which are presently utilized for a single-channel spectrometer, i.e., one having no control channel, are set forth in U.S. Patents 2,944,212 and 3,091,732. It would be advantageous to convert such forms of single-channel probe assemblies for use with an external reference system to afford field stability and thereby improve the sensitivity and the single-to-noise ratio of the spectrometer apparatsu.

The type of nuclear magnetic resonance (NMR) spectrometer which utilizes two separate channels, that is, a measurement or chemical analysis channel containing an unknown sample to be analyzed, and a control channel containing a known or reference sample for automatically adjusting the parameters of the measurement channel, acts to render the measurement channel field-frequency stabilized. The control or reference channel serves to correct for drift of the unidirectional polarizing field $H_0$ in which the analytical and reference samples are located. This system locks the polarizing field with relation to the radio frequency (R.F.) signal transmitted to the samples, whereby a ratio of field to frequency is established to maintain resonance of the reference sample. When the field and R.F. frequency are locked for optimum relationship, it is then possible to sweep through the spectrum at any rate with greatly reduced spectral noise.

In a probe assembly which includes separate tubes for the control and analytical samples, it is desirable to position the two sample probes as close together as possible with a polarizing magnetic field $H_0$. However, the control sample must be so placed relative to the analytical sample so that the sweep fields derived at the analytical sample from the modulation coils produce a minimum effect at the location of the control sample.

An object of this invention is to provide an improved probe asembly for high resolution gyromagnetic resonance apparatus to achieve greater sensitivity and an improved signal-to-nose ratio.

Another object of this invention is to provide an improved field-frequency control for a high resolution nuclear magnetic resonance spectrometer.

Another object is to provide a spectrometer probe assembly in an external reference system which affords minimum interaction between the control and analytical samples.

A further object is to provide a compact probe asembly which includes the control and analytical samples together with associated coils, spinner means and tuning paddles.

According to this invention, a gyromagnetic resonance apparatus, such as a high resolution NMR spectrometer which utilizes an external reference, comprises a novel probe assembly wherein a control sample tube and its associated coils are disposed with a tuning paddle that is positioned substantially orthogonally with relation to the longitudinal axis of an analytical sample tube. In addition, a coil assembly is coupled to the control sample and the current in such coil assembly is varied as the pen position of a spectrum recorder varies, whereby a calibrated spectra may be registered. The resultant varying magnetic field which is supplied to the control sample is effectively localized by means of the inventive configuration. An error signal for locking the polarizing field to the transmitter radio frequency is obtained from the inventive probe assembly an dserves to stabilize the field-frequency relationship with a minimum of parts and with improved performance.

The invention will be described in greater detail with reference to the drawing in which:

FIG. 1 is a schematic block diagram of a nuclear magnetic resonance apparatus, such as may be employed with this invention;

FIG. 2 is an isometric view of a novel probe assembly, including the analytical and control samples, according to this invention;

FIG. 3 is a fragmentary side view of the probe assembly depicted in FIG. 2;

FIG. 4 is an enlarged fragmentary view taken along lines 4—4 of the probe assembly shown in FIG. 3; and FIG. 5 is a cross-sectional view taken along lines 5—5 of FIG. 4.

In FIG. 1 an NMR spectrometer comprises a transmitter 10 that provides an exciting signal to an analytical probe 12 and a control probe 14 simultaneously. The transmitter 10 feeds the signal, which may be a 60 mc./sec. signal by way of example, through a transmitter coil 16 that is disposed adjacent to a sample tube or vial containing the unknown sample 18. At the same time the radio frequency signal from the transmitter 10 is passed through an attenuator 20 to the control probe 14 which includes a radio frequency coil 22 that encompasses a control or reference sample tube or container 24 holding the control sample. The R.F. coil 22 serves both as a transmitter and receiver coil for the control sample. Both probe assemblies are positioned in a unidirectional magnetic field $H_0$ between the poles of a magnet 26, which may be an electromagnet with a controllable power supply.

In operation, an audio frequency generator 28 supplies an audio or low frequency modulation signal, such as 2 kc./sec., by way of example, to a set of modulation coils 30 that are disposed adjacent to the unknown sample to produce sideband resonance signals from the unknown sample in a well-known manner. The modulation signal is also applied to an audio phase detector 32 that is coupled to the receiver circuit of the control probe 14.

As is well known, a gyromagnetic resonance signal is derived from the control sample through the sensing R.F. coil 22 and is channeled to a control receiver 34 and then to an R.F. phase detector 36. The phase detector 36 receives a reference signal from the transmitter 10 through a phase shifter 38 that is adapted to change the phase of the R.F. signal, thereby determining whether the absorption or dispersion mode is to be observed. In this case, assuming the field-frequency ratio is set so that resonance of the analytical sample is observed at the first sideband frequency due to the 2 kc. modulation, for example, as desired when spin decoupling, the phase shifter 38 is set for the dispersion mode. The reference radio frequency is compared to the control receiver radio frequency to produce an audio or low frequency output related to the modulation component introduced by the generator 28. However, the audio signal in the receiver channel polarizing field $H_0$ supplied by the magnet 26 and/or variation in radio frequency generated by the transmitter 10. To correct the spurious drift and variation the audio signal is amplified by the amplifier 40 and fed to the audio or low frequency phase detector 32 concomitantly with the modulation reference from the generator 28. A D.C. output signal is developed that is utilized in well-known manner for field-frequency control, i.e., to adjust the polarizing field $H_0$ and/or output frequency of the transmitter 10 so that maximum resonance of the control sample is attained.

With the field $H_0$ and the exciting radio frequency established for maximum resonance of the reference sample, a resonance signal is obtained from the analytical sample by means of a receiver coil 42 coupled to the sample and to the receiver channel. This signal is utilized to record a spectral trace delineating the resonance of the unknown sample on the chart of a recorder 44. All of the above elements and features are well-known and published in the prior art.

In keeping with this invention a set of Helmholtz coils 46 is employed with the control probe whereby D.C. variations may be introduced to the polarizing field $H_0$. A current that is determined by the pen position along the X-axis of the recorder (X being the direction of travel of the pen, the Y-axis representing the amplitude of the resonance signal) is applied to the coils 46 through a control circuit 48 coupled to a helipot or variable resistance 50 mechanically ganged to the pen carriage assembly 52 of the recorder. As the pen assembly 52 moves across the recorder chart, the D.C. current applied to the coils 46 is varied linearly.

The control sample is positioned in the probe so as to be substantially in a null of the audio frequency field supplied by the modulation coils 30 to minimize interaction. To effect the proper modulation signal at the control sample without affecting the analytical probe, the modulation signal from the low frequency generator 28 is applied to the small Helmholtz coils 46 through an amplifier 54 and D.C. blocking capacitor 56. Since the coils 46 are relatively small, about ¼-inch in diameter for example, and since they are spaced an appreciable distance from the analytical sample, at least ¾-inch by way of example, there is a minimum effect developed by the control modulation coils 46 at the analytical sample.

With reference to FIGS. 2–5, the inventive probe assembly comprises a housing 58 made from a nonmagnetic material, such as aluminum for example, which supports the analytical sample in a holder assembly 60 or analysis sample vial 18 that is engaged with a spinner means 62. Details of similar construction can be seen in U.S. Patent 3,091,732. In accordance with a feature of this invention, the container 24 for the control sample is secured within a rotatable coarse conductive tuning paddle 64 that projects into the probe housing 58, the cylindrical axis of the control sample container tube 24 being substantially orthogonal to the cylindrical axis of the container vial 18 for the analysis sample. The rotatable body of the paddle 64 may be made from brass and has a hollow portion for accommodating the container tube 24, which is supported within the paddle by a plastic support 63 fixed relative to the probe 68 and within the hollow portion of the paddle 64. The paddle 64, which preferably has a low magnetic susceptibility, also has a conductive cup 65 made of aluminum secured to its end disposed within the housing 58.

Both sample tubes or containers are disposed in a polarizing magnetic field $H_0$ provided by the pole pieces of the magnet 26. Another rotatable coarse paddle 66 which is positioned adjacent to the conductive paddle 64 is resistive in nature. The support 63 and the resistive paddle 66 may be made of a plastic such as Rexolite 1422, a product of American Enka Corp. of Concord, Mass. The Rexolite plastic is dimensionally stable, has low susceptibility and is optically clear. The coarse paddle 66 is formed with a glass ring 67 cemented to the end of the plastic body within the housing 58, the glass ring 67 having a gold-plated conductive ring theron. Teflon blocks 70 are urged against threaded portions 64a and 66a of the coarse paddles 64 and 66 to prevent screw backlash.

Fine tuning paddles 68a and 68b like the coarse paddles are also employed in a known manner for shifting or steering the radio frequency energy to provide R.F. phase shift. The fine tuning paddles 68a, b extend through a tubular fitting 72 that projects from an end of the housing 58 opposite to the coarse paddles 64 and 66, whereby fine adjustment may be made to balance the leakage between the transmitter and receiver circuits. Adjacent to the fitting 72 are couplers 74 and 76, respectively, for accommodating an input radio frequency from the transmitter 10 and for deriving an output radio frequency from the analytical sample to be applied to the sample receiver channel.

It is to be noted that the small Helmholtz coils 46 are displaced a substantial distance from the modulation coils 30 and therefore, in effect, provide a localized A.C. modulation and D.C. sweep to the control sample. Thus, stray or fringing fields from the D.C. sweep coils 46 do not affect the analytical sample and no undesirable gradients are produced at the analytical probe. In this manner the modulation fields to each sample can be effectively independent.

With the inventive apparatus disclosed herein it is possible to employ a 1000 milligauss D.C. sweep field in an NMR spectrometer with only a negligible broadening of line width in the observed spectrum. The long term stability of the $H_0$ field-to-frequency ratio is improved to one part in $10^8$, as compared to a prior achieved stability of one part in $10^6$. The novel probe assembly may be used with centerband or sideband systems.

It should be understood that the scope of this invention is not limited to the particular system, materials, dimensions, or electrical parameters set forth above, but encompasses various modifications.

What is claimed is:

1. A gyromagnetic resonance spectrometer comprising:
   a nonmagnetic housing;
   a first tube containing a sample to be analyzed, supported within said housing;
   a second tube containing a control sample positioned substantially orthogonally relative to said first tube within said housing;
   a tuning paddle containing said second tube and projecting into said housing;
   means for deriving a resonance signal separately from each of said samples;
   means for recording spectral lines representing such resonance signal from the sample to be analyzed, said recording means including a pen assembly that is driven in a given direction; and
   means for applying a D.C. sweep signal to said control sample, said sweep signal varying as the position of the recorder pen varies in the given direction.

2. A gyromagnetic resonance spectrometer as in claim 1 wherein said tuning paddle comprises a material having a low magnetic susceptibility.

3. A gyromagnetic resonance spectrometer as in claim 1 wherein said tuning paddle is made of brass and has a conductive element at one end projecting into said housing.

4. A gyromagnetic resonance spectrometer as in claim 1 wherein said housing and said tuning paddle have threaded portions for cooperative engagement, whereby said paddle may be advanced or retracted relative to said housing.

5. A gyromagnetic resonance spectrometer as in claim 1 further including a block urged against the threaded portion of said paddle for preventing backlash.

6. A gyromagnetic resonance spectrometer comprising:
- a nonmagnetic housing;
- a first tube containing a sample to be analyzed, supported within said housing;
- a second tube containing a control sample positioned substantially orthogonally relative to said first tube within said housing, said control tube being inserted within a tuning paddle projecting into the housing;
- means for applying a polarizing field to said samples;
- means for applying radio frequency energy simultaneously to said samples;
- means for applying a low frequency modulation signal to said samples;
- means for deriving a resonance signal separately from each of said samples;
- means for recording spectral lines representing such resonance signal from the sample to be analyzed, said recording means including a pen assembly that is driven in a given direction; and
- means for applying a D.C. sweep signal to said control sample, said sweep signal varying as the position of the recorder pen varies in the given direction.

References Cited

UNITED STATES PATENTS

| | | | |
|---|---|---|---|
| 3,034,040 | 5/1962 | Williams | 324—.5 |
| 3,081,428 | 3/1963 | Fowler | 324—.5 |
| 3,091,732 | 5/1963 | Anderson et al. | 324—.5 |
| 3,172,035 | 3/1965 | Arnold et al. | 324—.5 |

OTHER REFERENCES

Baker et al., Review of Scientific Instruments, vol. 28, No. 5, May 1957, pgs. 313–321, incl.

WALTER L. CARLSON, *Primary Examiner.*

MAYNARD R. WILBUR, *Examiner.*

M. J. LYNCH, *Assistant Examiner.*